(12) United States Patent
Hu

(10) Patent No.: US 12,056,300 B2
(45) Date of Patent: Aug. 6, 2024

(54) STRETCHABLE DISPLAY MODULE AND STRETCHABLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Li Hu, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/599,541
(22) PCT Filed: Sep. 18, 2021
(86) PCT No.: PCT/CN2021/119211
§ 371 (c)(1),
(2) Date: Sep. 28, 2021
(87) PCT Pub. No.: WO2023/035314
PCT Pub. Date: Mar. 16, 2023

(65) Prior Publication Data
US 2024/0053841 A1 Feb. 15, 2024

(30) Foreign Application Priority Data
Sep. 13, 2021 (CN) .......................... 202111066456.4

(51) Int. Cl.
*G06F 3/041* (2006.01)
*G06F 1/16* (2006.01)
*G06F 3/044* (2006.01)

(52) U.S. Cl.
CPC .......... *G06F 3/0412* (2013.01); *G06F 1/1652* (2013.01); *G06F 3/04164* (2019.05);
(Continued)

(58) Field of Classification Search
CPC .... G06F 1/1652; G06F 3/0412; G06F 3/0416; G06F 3/04164; G06F 3/044;
(Continued)

(56) References Cited

U.S. PATENT DOCUMENTS

2012/0127099 A1  5/2012  Liu et al.
2013/0153270 A1* 6/2013  Hung .................. H05K 1/0277
                                            174/254
(Continued)

FOREIGN PATENT DOCUMENTS

CN    109189265 A    1/2019
CN    109634466 A    4/2019
(Continued)

OTHER PUBLICATIONS

International Search Report in International application No. PCT/CN2021/119211, mailed on Jun. 14, 2022.
(Continued)

*Primary Examiner* — Nathan Danielsen
(74) *Attorney, Agent, or Firm* — PV IP PC; Wei Te Chung; Zhigang Ma

(57) ABSTRACT

An embodiment of the present application discloses a stretchable display module and a stretchable display device. The stretchable display module comprises a display panel and a touch layer embedded in the display panel. The display panel includes island regions, bridge connection regions, and aperture regions. A pixel island is disposed in each of the island regions. Each of the connection bridges is connected to adjacent two of the pixel islands. The touch layer comprises touch modules. One touch module is disposed in each of the pixel islands, adjacent two of at least some of the touch modules are connected to each other through the connection bridge.

14 Claims, 7 Drawing Sheets

(52) U.S. Cl.
CPC .......... *G06F 3/0443* (2019.05); *G06F 3/0446* (2019.05); *G06F 2203/04102* (2013.01); *G06F 2203/04111* (2013.01)

(58) Field of Classification Search
CPC ....... G06F 3/0443; G06F 3/0446–0448; G06F 2203/04102; G06F 2203/04111; G09G 3/32–3291; G09G 2300/0421; G09G 2300/0426; G09G 2380/02
See application file for complete search history.

(56) References Cited

U.S. PATENT DOCUMENTS

| | | | | |
|---|---|---|---|---|
| 2015/0144920 | A1* | 5/2015 | Yamazaki | G06F 3/0446 257/40 |
| 2017/0269749 | A1* | 9/2017 | Bok | G06F 3/0446 |
| 2021/0057659 | A1* | 2/2021 | Sun | G09G 3/3258 |
| 2022/0085130 | A1* | 3/2022 | Zhai | G06F 3/044 |

FOREIGN PATENT DOCUMENTS

| | | |
|---|---|---|
| CN | 110851028 A | 2/2020 |
| CN | 111968522 A | 11/2020 |
| CN | 112071893 A | 12/2020 |
| CN | 112635688 A | 4/2021 |
| CN | 112863342 A | 5/2021 |
| CN | 112882596 A | 6/2021 |

OTHER PUBLICATIONS

Written Opinion of the International Search Authority in International application No. PCT/CN2021/119211, mailed on Jun. 14, 2022.
Chinese Office Action issued in corresponding Chinese Patent Application No. 202111066456.4 dated Apr. 26, 2023, pp. 1-8.

* cited by examiner

STRETCHABLE DISPLAY MODULE AND STRETCHABLE DISPLAY DEVICE

RELATED APPLICATIONS

This application is a Notional Phase of PCT Patent Application No. PCT/CN2021/119211 having international filing date of Sep. 18, 2021, which claims the benefit of priority of Chinese Patent Application No. 202111066456.4 filed on Sep. 13, 2021. The contents of the above applications are all incorporated by reference as if fully set forth herein in their entirety.

FIELD OF INVENTION

The present application relates to a field of displays, especially to a stretchable display module and a stretchable display device.

BACKGROUND OF INVENTION

A stretchable flexible display technology is a flexible display technology combing an inorganic electronic display device and a flexible structured base material integrally by an inorganic thin film transfer process to achieve deformable screen. The stretchable flexible display technology will have a wide range of application prospects in medical, human-computer interaction, vehicle display and other fields. At the same time, with the rapid development of display technology, a touch technology has also become an indispensable part of display products.

SUMMARY OF INVENTION

Technical Issue

At present, in flexible display products such as micro light emitting diode (Micro LED) flexible display products, an external touch display panel is usually used to realize the touch function, which results in that an overall thickness of the flexible touch display product is relatively large and the cost is high, and also reduces an application range of such Micro LED flexible display products.

Technical Solution

An embodiment of the present application provides a stretchable display module and a stretchable display device to solve a technical issue that an entire thickness of a conventional flexible touch display product is large and has high costs.

The embodiment of the present application provides a stretchable display module, comprising a display panel and a touch layer embedded in the display panel, wherein the display panel comprises a plurality of island regions disposed at intervals, bridge connection regions each of which is located between adjacent two of the island regions, and aperture regions each of which is defined between each of the island regions and each of the bridge connection regions, and the display panel comprises:

a flexible underlay disposed in the island regions and the bridge connection regions;

a plurality of pixel islands disposed on the flexible underlay, wherein one of the pixel islands is disposed in each of the island regions, and at least one pixel is disposed on each of the pixel islands;

a plurality of connection bridges disposed in the bridge connection regions, wherein each of the connection bridges is connected to adjacent two of the pixel islands;

wherein the touch layer comprises a plurality of touch modules disposed in the island regions, one of the touch modules is disposed on each of the pixel islands, and adjacent two of at least some of the touch modules are connected to each other through the connection bridges.

In the stretchable display module provided by the embodiment of the present application, the touch module comprises a first touch electrode layer and a first touch connection line connected to the first touch electrode layer;

the stretchable display module comprises a control circuit, an end of the first touch connection line away from the first touch electrode layer is connected to the control circuit through the connection bridges; and the pixel on the pixel islands is electrically connected to the control circuit through the connection bridges.

In the stretchable display module provided by the embodiment of the present application, the touch layer comprises a plurality of touch units and a plurality of touch signal lines, each of the touch units is connected to one of the touch signal lines, and each of the touch units comprises at least two of the touch modules; and in one of the touch units, adjacent two of the touch modules are connected through the connection bridge.

In the stretchable display module provided by the embodiment of the present application, the pixel island comprises a first metal layer, first insulation layer, a second metal layer, a second insulation layer, and a third metal layer that are stacked on the flexible underlay from bottom to top; and one of the first metal layer, the second metal layer, and the third metal layer comprises the first touch electrode layer.

In the stretchable display module provided by the embodiment of the present application, one of the first metal layer, the second metal layer, and the third metal layer comprises the first touch connection line.

In the stretchable display module provided by the embodiment of the present application, the first insulation layer and/or the second insulation layer is disposed between the first touch electrode layer and the first touch connection line; and a first via hole is defined in the pixel island and is located between the first touch electrode layer and the first touch connection line, and the first touch electrode layer is connected to the first touch connection line through the first via hole.

In the stretchable display module provided by the embodiment of the present application, the touch layer further comprises a second touch electrode layer, and a second touch connection line connected to the second touch electrode layer, an end of the second touch connection line away from the second touch electrode layer is connected to the control circuit through the connection bridge, and the first insulation layer and/or the second insulation layer is disposed between the first touch electrode layer and the second touch electrode layer;

a plurality of the pixel islands and a plurality of the touch modules are arranged in arrays respectively, adjacent two of the touch modules are arranged along a first direction or along a second direction, a plurality of the connection bridges comprise a plurality of first connection bridges and a plurality of second connection bridges, adjacent two of the touch modules arranged along the first direction are connected to each other through the first connection bridge, adjacent two of the touch modules arranged along the second direction are connected to each other through the second connection bridge; and the first connection bridges are connected to the first touch connection lines of the touch modules, the second connection bridges are connected to the second touch connection lines in the touch modules.

In the stretchable display module provided by the embodiment of the present application, the first metal layer, the second metal layer, and the third metal layer comprises the second touch electrode layer and the second touch connection line.

In the stretchable display module provided by the embodiment of the present application, t the first insulation layer and/or the second insulation layer is disposed between the second touch electrode layer and the second touch connection line; and a second via hole is defined in the pixel island and is located between the second touch electrode layer and the second touch connection line, and the second touch electrode layer is connected to the second touch connection line through the second via hole.

In the stretchable display module provided by the embodiment of the present application, the first metal layer, the second metal layer, and the third metal layer comprises the first touch electrode layer; and another of the first metal layer, second metal layer, and the third metal layer comprises the second touch electrode layer.

In the stretchable display module provided by the embodiment of the present application, the connection bridge and one of the first touch electrode layer, the second touch electrode layer, the first touch connection line, and the second touch connection line are disposed in the same layer and are integrally formed structure.

In the stretchable display module provided by the embodiment of the present application, the display panel further comprises an organic filling layer disposed on the flexible underlay and located in the bridge connection region, and the connection bridge is disposed on the organic filling layer.

In the stretchable display module provided by the embodiment of the present application, the display panel further comprises a through hole defined in the aperture region, and the through hole extends through the flexible underlay.

In the stretchable display module provided by the embodiment of the present application, the display panel further comprises a first substrate and a second substrate disposed oppositely, and a flexible protective layer, the flexible protective layer, the flexible underlay, the pixel islands, and the connection bridges are disposed between the first substrate and the second substrate; and the flexible protective layer comprises a first flexible adhesive layer disposed between the flexible underlay and the first substrate, a second flexible adhesive layer disposed between the pixel island and the second substrate, and a third flexible adhesive layer disposed in the through hole.

The present application also provides a stretchable display device, comprising a stretchable display module;

wherein the stretchable display module comprises a display panel and a touch layer embedded in the display panel, the display panel comprises a plurality of island regions disposed at intervals, bridge connection regions each of which is located between adjacent two of the island regions, and aperture regions each of which is defined between each of the island regions and each of the bridge connection regions, and the display panel comprises:

a flexible underlay disposed in the island regions and the bridge connection regions;

a plurality of pixel islands disposed on the flexible underlay, wherein one of the pixel islands is disposed in each of the island regions, and at least one pixel is disposed on each of the pixel islands;

a plurality of connection bridges disposed in the bridge connection regions, wherein each of the connection bridges is connected to adjacent two of the pixel islands;

wherein the touch layer comprises a plurality of touch modules disposed in the island regions, one of the touch modules is disposed on each of the pixel islands, and adjacent two of at least some of the touch modules are connected to each other through the connection bridges.

In the stretchable display device provided by the embodiment of the present application, the touch module comprises a first touch electrode layer and a first touch connection line connected to the first touch electrode layer;

the stretchable display module comprises a control circuit, an end of the first touch connection line away from the first touch electrode layer is connected to the control circuit through the connection bridges; and the pixel on the pixel islands is electrically connected to the control circuit through the connection bridges.

In the stretchable display device provided by the embodiment of the present application, the touch layer comprises a plurality of touch units and a plurality of touch signal lines, each of the touch units is connected to one of the touch signal lines, and each of the touch units comprises at least two of the touch modules; and in one of the touch units, adjacent two of the touch modules are connected through the connection bridge.

In the stretchable display device provided by the embodiment of the present application, the pixel island comprises a first metal layer, first insulation layer, a second metal layer, a second insulation layer, and a third metal layer that are stacked on the flexible underlay from bottom to top; and one of the first metal layer, the second metal layer, and the third metal layer comprises the first touch electrode layer.

In the stretchable display device provided by the embodiment of the present application, the touch layer further comprises a second touch electrode layer, and a second touch connection line connected to the second touch electrode layer, an end of the second touch connection line away from the second touch electrode layer is connected to the control circuit through the connection bridge, and the first insulation layer and/or the second insulation layer is disposed between the first touch electrode layer and the second touch electrode layer;

a plurality of the pixel islands and a plurality of the touch modules are arranged in arrays respectively, adjacent two of the touch modules are arranged along a first direction or along a second direction, a plurality of the connection bridges comprise a plurality of first connection bridges and a plurality of second connection bridges, adjacent two of the touch modules arranged along the first direction are connected to each other through the first connection bridge, adjacent two of the touch modules arranged along the second direction are connected to each other through the second connection bridge; and the first connection bridges are connected to the first touch connection lines of the touch modules, the second connection bridges are connected to the second touch connection lines in the touch modules.

Advantages

Advantages of the present application are as follows: the embodiment of the present application embeds the touch layer into the display panel and disposes the touch modules in the island regions respectively. One of the touch modules is disposed in each of the pixel islands, adjacent two of at least some of the touch modules are connected to each other through the connection bridges such that the touch layer and each pixel islands of the display panel are combined tightly structurally, which prevents increase of stretchable display module thickness and lowers manufacturing costs of the stretchable display module with touch functions while guaranteeing display panel flexible stretchable and achieving touch functions.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF PREFERRED EMBODIMENTS

Figure 1:
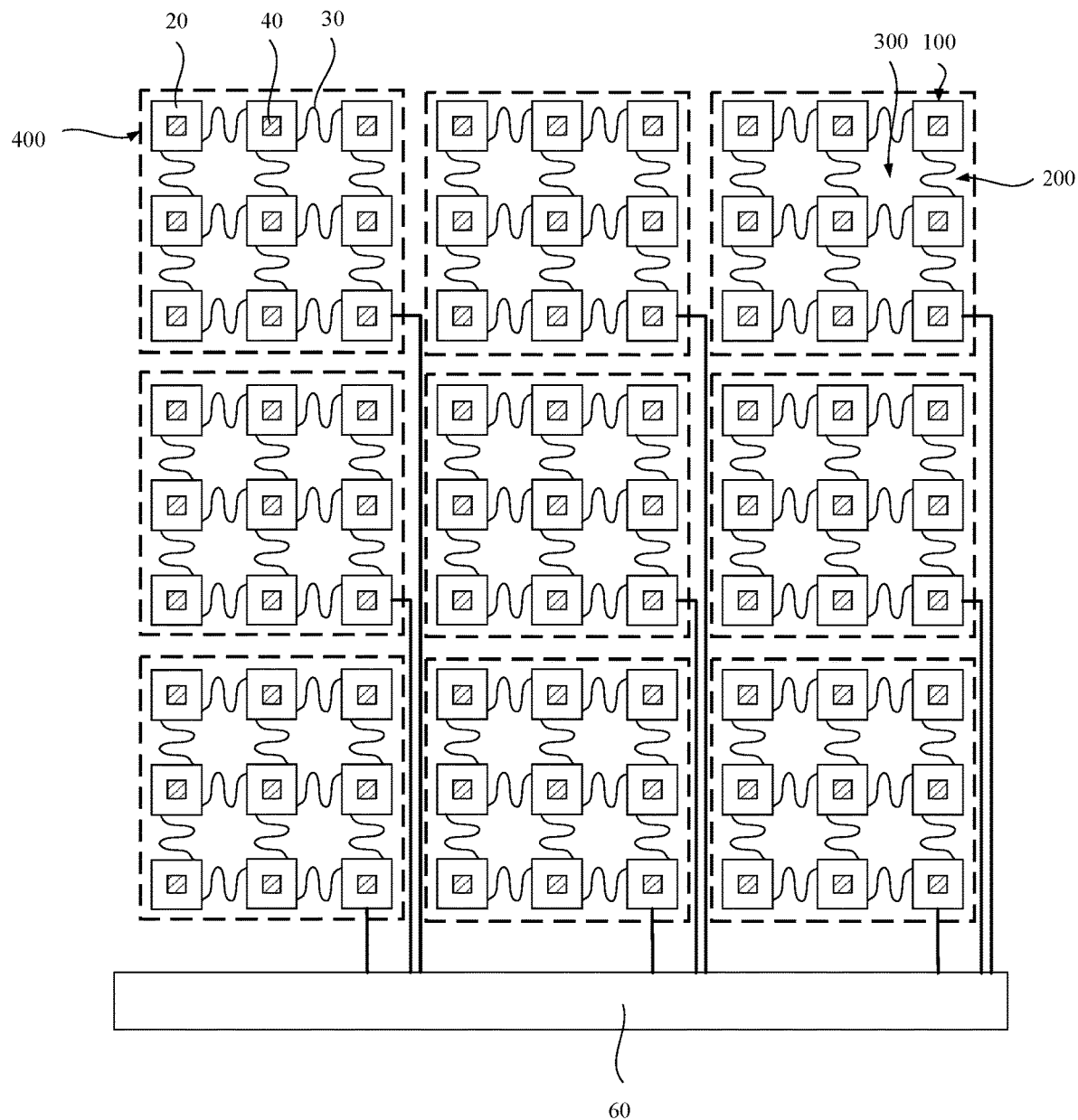
FIG. 1 is a first schematic plan structural view of a stretchable display module provided by an embodiment of the present application.

Each of the following embodiments is described with appending figures to illustrate specific embodiments of the present invention that are applicable. The terminologies of direction mentioned in the present invention, such as "upper", "lower", "front", "rear", "left", "right", "inner", "outer", "side surface", etc., only refer to the directions of the appended figures. Therefore, the terminologies of direction are used for explanation and comprehension of the present invention, instead of limiting the present invention. In the figures, units with similar structures are marked with the same reference characters.

In descriptions of the present application, it should be understood that terminologies "first", "second" are only for the purposes of description, and cannot be understood as indication or implication of comparative importance or a number of technical features. Therefore, a feature limited with "first", "second" can expressly or implicitly include one or more features. In the description of the present application, a meaning of "a plurality of" is two or more, unless there is a clear and specific limitation otherwise.

In the descriptions of the present application, it should be noted that unless clear rules and limitations otherwise exist, terminologies "install", "connect", "connection" should be understood in a broad sense. For instance, the connection can be a fixed connection, a detachable connection or an integral connection. The connection can be a mechanical connection, an electrical connection or a telecommunication. The connection can be a direct connection, an indirect connection through an intermedium, can be an internal communication between two elements or an interaction between the two elements. For a person of ordinary skill in the art, the specific meaning of the above terminology in the present application can be understood on a case-by-case basis.

The technical solutions of the present application are described with specific embodiments.

Figure 2:
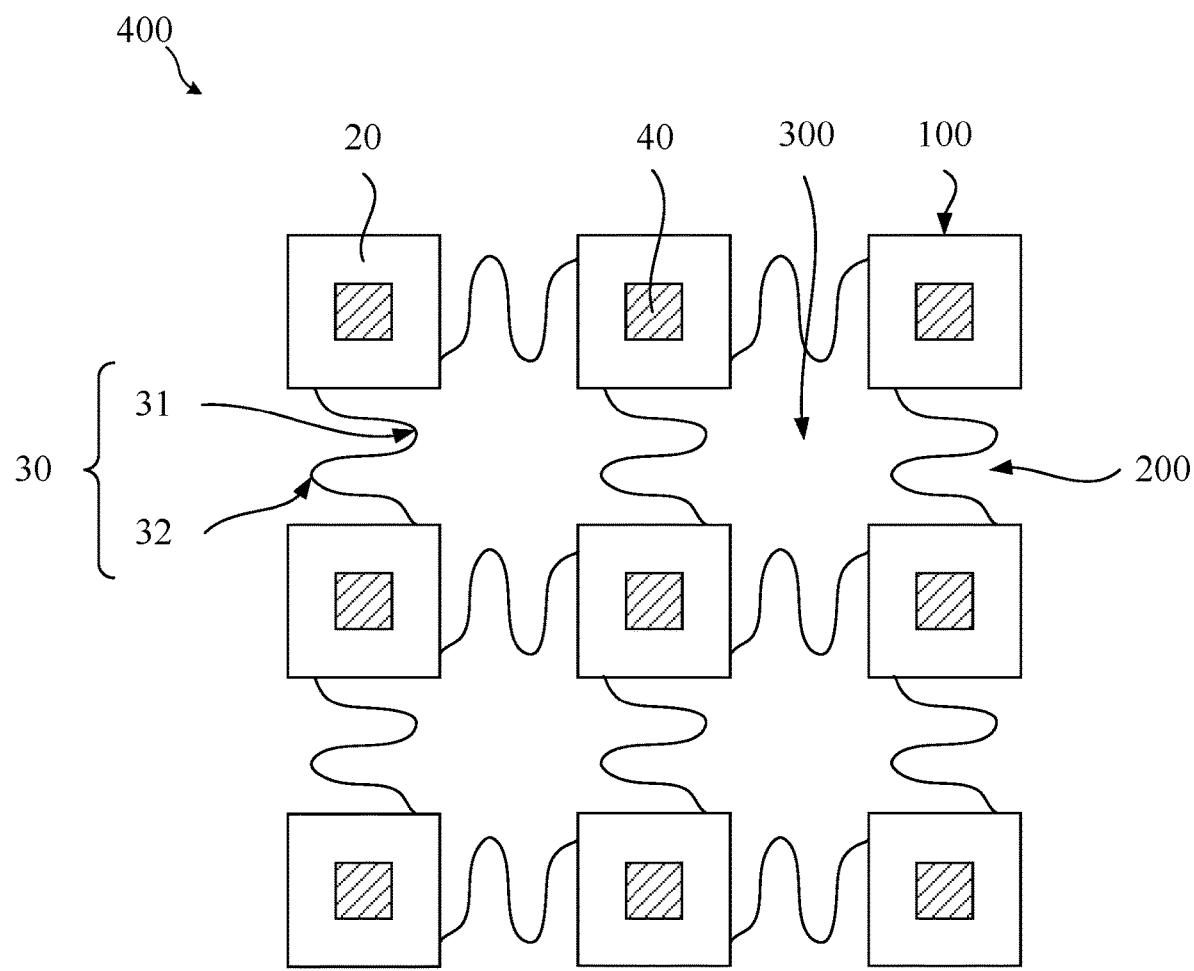
FIG. 2 is a schematic structural view of touch units of the stretchable display module provided by the embodiment of the present application.
Figure 3:
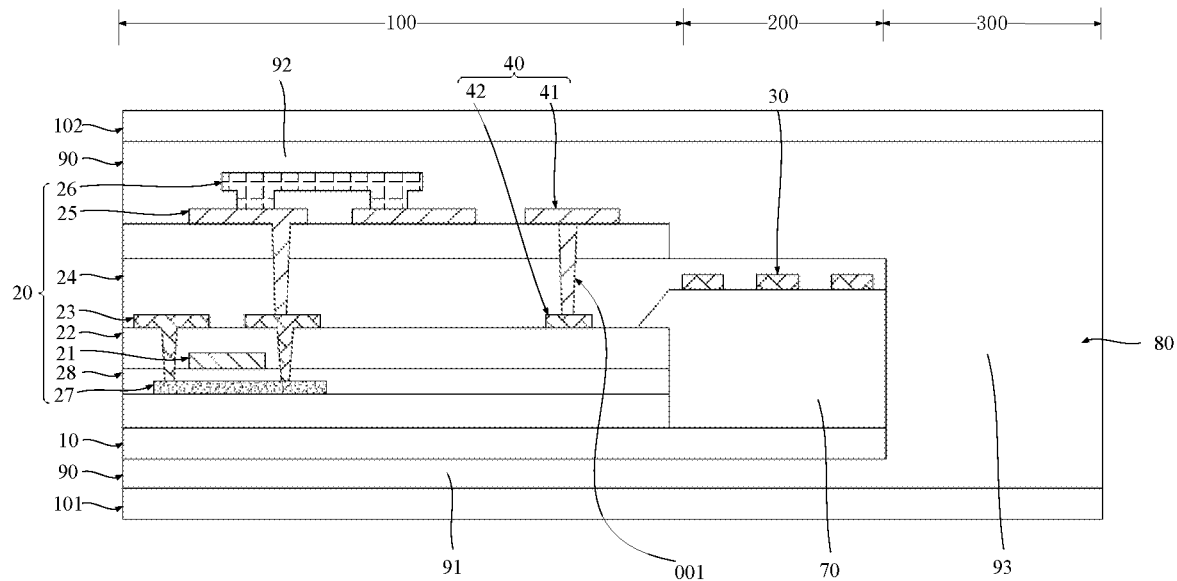
FIG. 3 is a film layer schematic structural view of the stretchable display module provided by the embodiment of the present application.

With reference to FIGS. 1 to 3, the embodiment of the present application provides a stretchable display module comprising a display panel and a touch layer embedded in the display panel. The display panel comprises a plurality of island regions 100 disposed at intervals, bridge connection regions 200 each of which is located adjacent two of the island regions 100, and aperture regions 300 defined between each of the island regions 100 and each of the bridge connection regions 200. The display panel comprises:

a flexible underlay 10 disposed in the island regions 100 and the bridge connection regions 200;

a plurality of pixel islands 20 disposed on the flexible underlay 10, wherein one of the pixel islands 20 is disposed in each of the island regions 100, and at least one pixel is disposed on each of the pixel islands 20;

a plurality of connection bridges 30 disposed in the bridge connection regions 200, wherein each of the connection bridges 30 connected adjacent two of the pixel islands 20;

wherein the touch layer comprises a plurality of touch modules 40 disposed in the island regions 100, one of the touch modules 40 is disposed on each of the pixel islands 20, and adjacent two of at least some of the touch modules 40 are connected to each other through the connection bridges 30.

It can be understood that at present, in flexible display products such as micro light emitting diode (Micro LED) flexible display products, an external touch display panel is usually used to realize the touch function, which results in that an overall thickness of the flexible touch display product is relatively large and the cost is high, and also reduces an application range of such Micro LED flexible display products. The embodiment of the present application embeds the touch layer into the display panel and disposes the touch modules 40 in the island regions 100 respectively. One of the touch modules 40 is disposed in each of the pixel islands, adjacent two of at least some of the touch modules are connected to each other through the connection bridges 30 such that the touch layer and each pixel islands 20 of the display panel are combined tightly structurally, which prevents increase of stretchable display module thickness and lowers manufacturing costs of the stretchable display module with touch functions while guaranteeing display panel flexible stretchable and achieving touch functions.

It should be explained that with reference to FIGS. 1 and 2, the connection bridge 30 is curved, can comprise a first bending section 31 and a second bending section 32. A partial slight deformation of each of the curved connection bridges 30 can obtain a greater accumulated amount of deformation to achieve stretchable display. The connection bridge 30 has a longer wire length according to a curved shape, and can effectively release stress during a stretching process by an external force to prevent the wire from deforming large to cause sudden variation of a resistance value to further result in instable variation of optical display and uneven brightness during the stretching process. In the present embodiment, curving directions of the first bending section 31 and the second bending section 32 are different. Each of the pixel islands 20 comprises a plurality of side edges, and each of the side edges is connected correspondingly to one of the connection bridges 30. The connection bridges 30 connected to the same pixel island 20 are arranged in a centrosymmetric structure relative to a center of the corresponding pixel island 20 top guarantee that the pixel islands 20 are forced evenly and simultaneously deform when stretched and. The pixel islands 20 store elastic potential after stretched simultaneously. When the external force is removed, the stretchable display module restores to an initial state to achieve a repeatedly stretching capability. Specifically, the pixel islands 20 is square, the four side edges If the pixel island 20 are connected correspondingly to the connection bridges 30 respectively. In other embodiment, the pixel islands 20 can be one of rectangular, rhombic, trapezoidal, circular, elliptical, and other shapes, but are not limited thereto.

It is worth noting that the display panel in the present application can specifically be an organic light emitting diode (OLED) display structure, and can be a micro LED structure, and is not limited thereto. In the embodiment of the present application, display panels including micro LED structures are taken as an example for explanation when on specific indication. Each of the touch modules 40 is connected through the connection bridge 30 to achieve the touch function. Each of the pixel islands 20 achieve a display function through the connection bridges 30. In the present embodiment, to prevent crosstalk between driving signals and touch signals on the connection bridges 30, a time division multiplexing process can be adopted to achieve display and touch functions of the stretchable display module.

In an embodiment, with reference to FIGS. 1 to 2, the touch modules 40 comprises a first touch electrode layer 41 and a first touch connection line 42 connected to the first touch electrode layer 41. The stretchable display module comprises control circuit 60, an end of the first touch connection line 42 away from the first touch electrode layer 41 is connected to the control circuit 60 through the connection bridge 30. A pixel on the pixel island 20 is electrically connected to the control circuit 60 through the connection bridges 30. In the present embodiment, to prevent crosstalk between driving signals and touch signals on the connection bridges 30, a time-division multiplexing process can be adopted to achieve display and touch functions of the stretchable display module.

It can be understood that one of the touch modules 40 is disposed to correspond to one of the pixel islands 20. The touch module 40 comprises a first touch electrode layer 41 and a first touch connection line 42 connected to the first touch electrode layer 41. An end of the first touch connection line 42 away from the first touch electrode layer 41 is connected to the connection bridge 30. Apparently, the first touch electrode layer 41 at least comprises a first touch electrode, the first touch connection line 42 is configured to connect the first touch electrode and the connection bridge 30, and connect the first touch electrode layers 41 in at least some of the touch modules 40 through the connection bridges 30 to achieve touch signal transmission such that each of the touch modules 40 has a flexible stretchable function.

In an embodiment, with reference to FIGS. 1 and 2, the touch layer comprises a plurality of touch units 400 and a plurality of touch signal lines, each of the touch units 400 is connected to one of the touch signal lines, and one of the touch units 400 comprises at least two of the touch modules 40;

In one of the touch units 400, adjacent two of the touch modules 40 are connected to each other through the connection bridges 30.

It can be understood that the touch layer can be a self-capacitive touch structure. The touch layer comprises a plurality of touch units 400 and a plurality of touch signal lines. Each of the touch units 400 is connected to one of the touch signal lines. Each of the touch units 400 transmits control signals through a corresponding one of the touch signal lines. One of the touch units 400 comprises at least two of the touch modules 40. In each of the touch units 400, adjacent two of the touch modules 40 are connected to each other through the connection bridge 30, and are connected to a corresponding one of the touch signal lines. The stretchable display module further comprises a control circuit 60, an end of each of the touch signal lines is connected to one of the touch units 400, another end of the touch signal line is connected to the control circuit 60.

It should be explained that each of the touch units 400 can comprise a plurality of touch modules 40. Adjacent two of the touch modules 40 are connected to each other through the connection bridge 30. Namely, in one of the touch units 400, one of the touch modules 40 and adjacent one of the touch modules 40 are connected to each other through the connection bridge 30. With reference to FIGS. 1 and 2, each of the touch units 400 comprises nine touch modules 40 arranged in an array. One of the touch module 40 located at a center is connected to surrounding ones of the touch modules 40 through different connection bridges 30, adjacent two of the touch modules 40 located in different touch units 400 are not connected to each other through the connection bridge 30.

In an embodiment, with reference to FIGS. 3 to 7, the pixel islands 20 comprises a first metal layer 21, a first insulation layer 22, a second metal layer 23, a second insulation layer 24, and a third metal layer 25 stacked on the flexible underlay 10 from bottom to top.

One of the first metal layer 21, the second metal layer 23, and the third metal layer 25 comprises the first touch electrode layer 41.

It can be understood that by making one of the first metal layer 21, the second metal layer 23, and the third metal layer 25 have the first touch electrode layer 41, and also making the first touch electrode layer 41 to be disposed in the same layer with other structures in the first metal layer 21, the second metal layer 23, or the third metal layer 25, the touch function of the stretchable display module can be achieved under a precondition of not affecting an entire thickness of the stretchable display module. In the meantime, adding processes for individually manufacturing the first touch electrode layer 41 is prevented to lower the manufacturing costs of the stretchable display module including the touch function.

It should be explained that each of the pixel islands 20 comprises a micro light emitting diode 26 and at least one thin film transistor layer driving the micro light emitting diode 26. The thin film transistor layer of the pixel island 20 comprises a first metal layer 21, first insulation layer 22, a second metal layer 23, a second insulation layer 24, and a third metal layer 25 stacked on the flexible underlay 10 from bottom to top. Specifically, the structure of the thin film transistor of the thin film transistor layer can be a structure of a top gate type or a bottom gate type. In the present embodiment, taking the bottom gate type as an example, the first metal layer 21 can comprise a gate electrode. The second metal layer 23 can comprise a source electrode and a drain electrode. The third metal layer 25 can be connected to the second metal layer 23, and the third metal layer 25 comprises two leads connected to the micro light emitting diode 26. Furthermore, the pixel islands 20 further comprises an active layer 27 disposed on the flexible underlay 10. A gate electrode insulation layer 28 is disposed between the active layer 27 and the first metal layer 21, the second insulation layer 24 can comprise a planarization layer and a passivation protective layer, a buffer layer is disposed between the flexible underlay 10 and the active layer 27.

Figure 4:
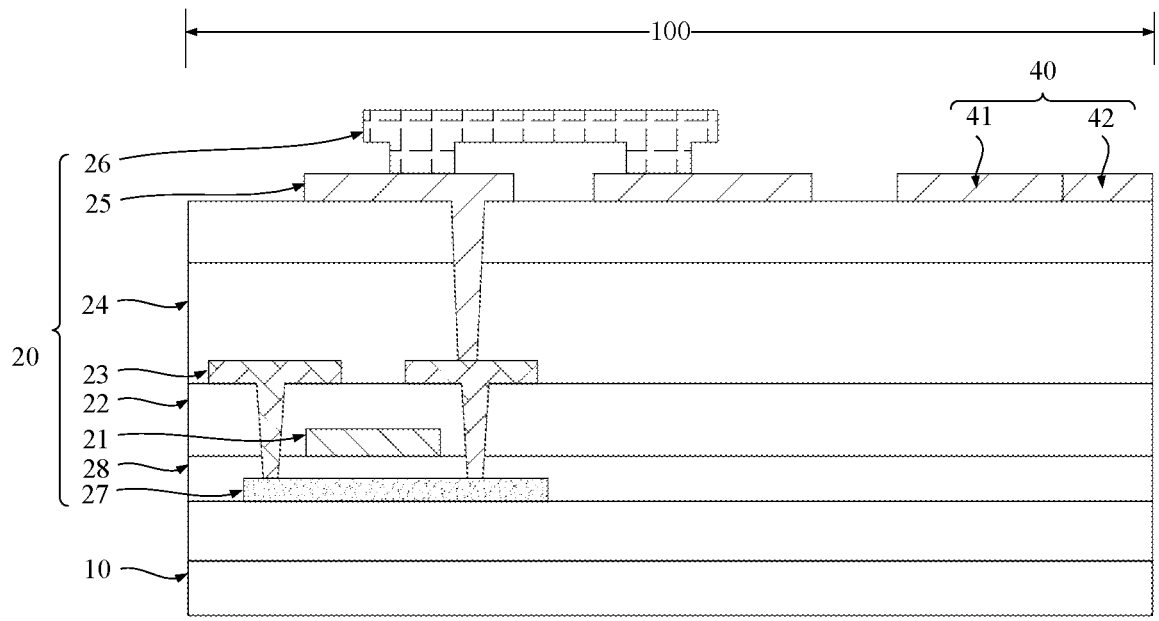
FIG. 4 is a first film layer schematic structural view of a pixel island of the stretchable display module provided by the embodiment of the present application.

In the present embodiment, with reference to FIG. 4, one of the first metal layer 21, the second metal layer 23, and the third metal layer 25 comprises the first touch connection line 42.

It can be understood that by making one of the first metal layer 21, the second metal layer 23, and the third metal layer 25 have the first touch connection line 42 to make the first touch connection line 42 able to be disposed in the same layer and be formed integrally with other structure in the first metal layer 21, the second metal layer 23, or the third metal layer 25, the touch function of the stretchable display module can be achieved under a precondition of not affecting the entire thickness of the stretchable display module. In the meantime, adding processes for individually manufacturing the first touch electrode layer 42 is prevented to lower the manufacturing costs of the stretchable display module including the touch function.

It should be explained that one of the first metal layer 21, the second metal layer 23, and the third metal layer 25 can simultaneously comprise the first touch electrode layer 41 and the first touch connection line 42 to make the first touch electrode layer 41 and the first touch connection line 42 are disposed in the same layer and are formed integrally with other structure in the first metal layer 21, second metal layer 23 in the third metal layer 25. Apparently, the first touch electrode layer 41 and the first touch connection line 42 are manufactured by the same process. On the basis of conventional manufacturing processes, only an etched pattern of one of the first metal layer 21, the second metal layer 23, and the third metal layer 25 is required to be adjusted to prevent affecting manufacturing structures of film layers, which maximally lowers the manufacturing costs of the stretchable display module including the touch function and prevents additionally adding the thickness of the stretchable display module.

It is worth noting that when the first touch electrode layer 41 and the first touch connection line 42 are disposed in the same layer and are an integrally formed structure, for convenience of two ends of the first touch connection line 42 connected to the first touch electrode layer 41 and the connection bridge 30 respectively, the first touch electrode layer 41 and the first touch connection line 42 and a metal layer in which the connection bridges 30 is located can be disposed in the same layer. In an embodiment, the second metal layer 23 can comprise the first touch electrode layer 41, the first touch connection line 42, and the connection bridges 30.

Figure 5:
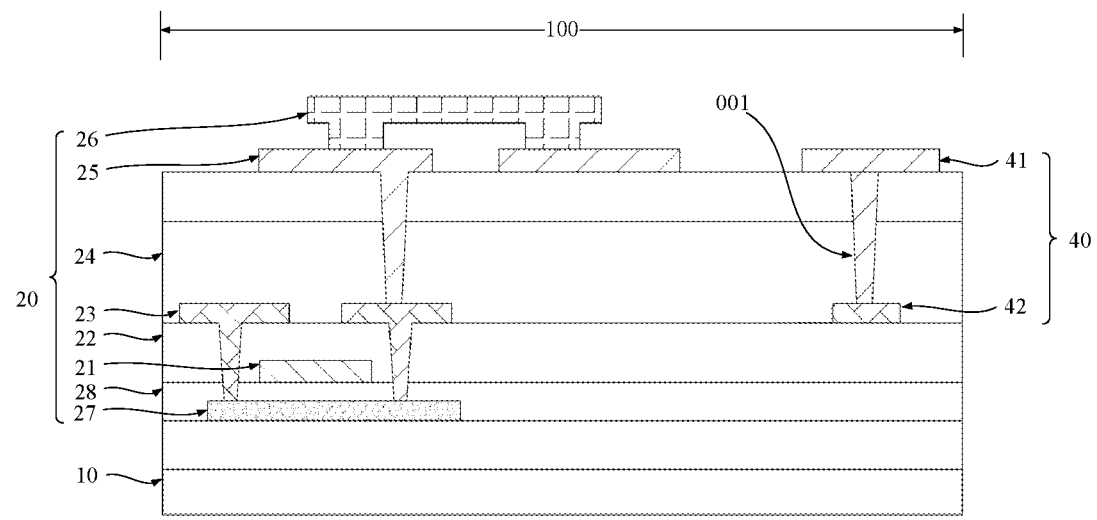
FIG. 5 is a second film layer schematic structural view of the pixel island of the stretchable display module provided by the embodiment of the present application.
Figure 6:
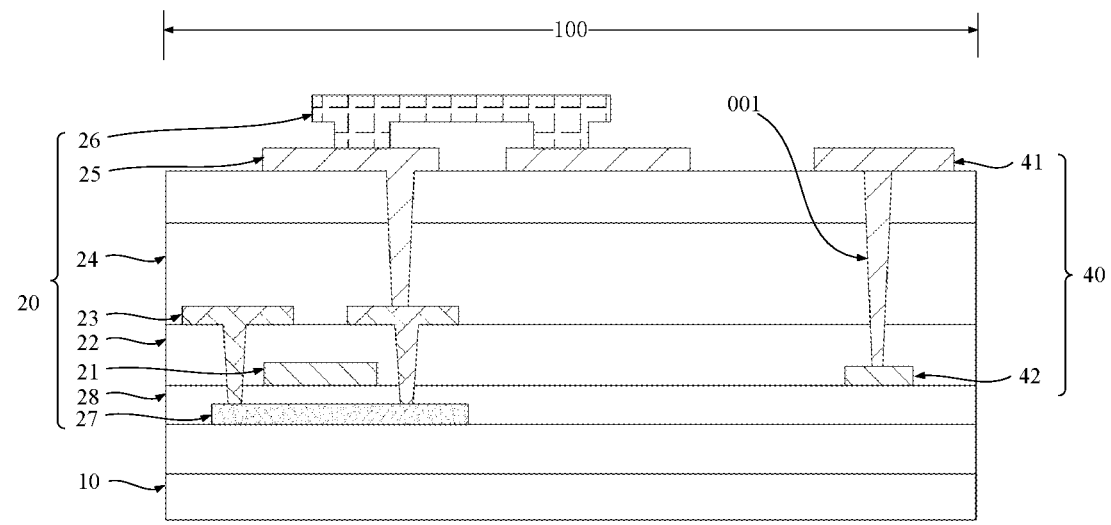
FIG. 6 is a third film layer schematic structural view of the pixel island of the stretchable display module provided by the embodiment of the present application.
Figure 7:
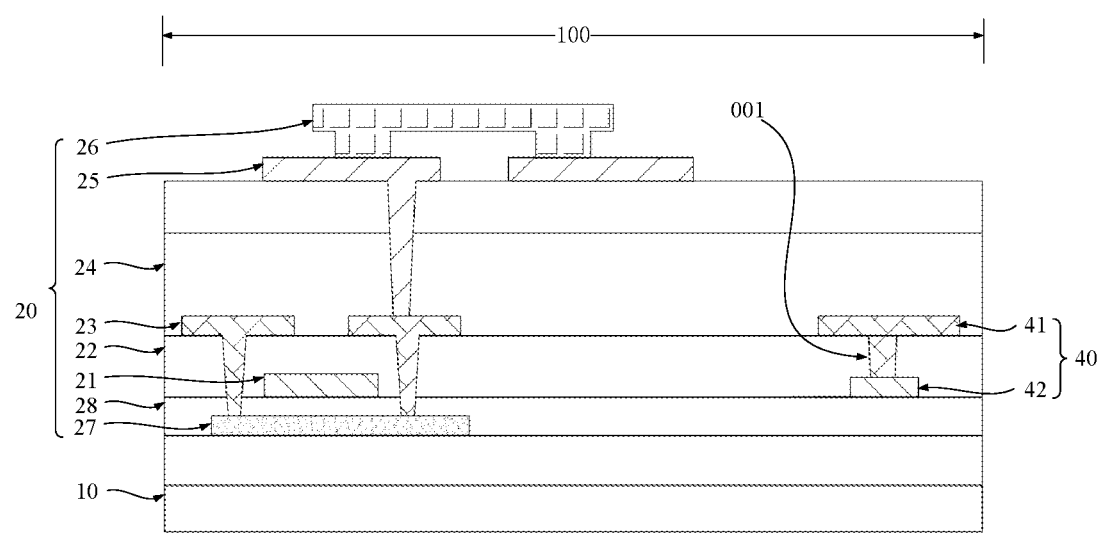
FIG. 7 is a fourth film layer schematic structural view of the pixel island of the stretchable display module provided by the embodiment of the present application.

In an embodiment, with reference to FIGS. 5 to 7, the first insulation layer 22 and/or the second insulation layer 24 is disposed between the first touch electrode layer 41 and the first touch connection line 42.

A first via hole 001 is defined in the pixel islands 20 and is located between the first touch electrode layer 41 and the first touch connection line 42. The first touch electrode layer 41 is connected to the first touch connection line 42 through the first via hole 001.

Figure 8:
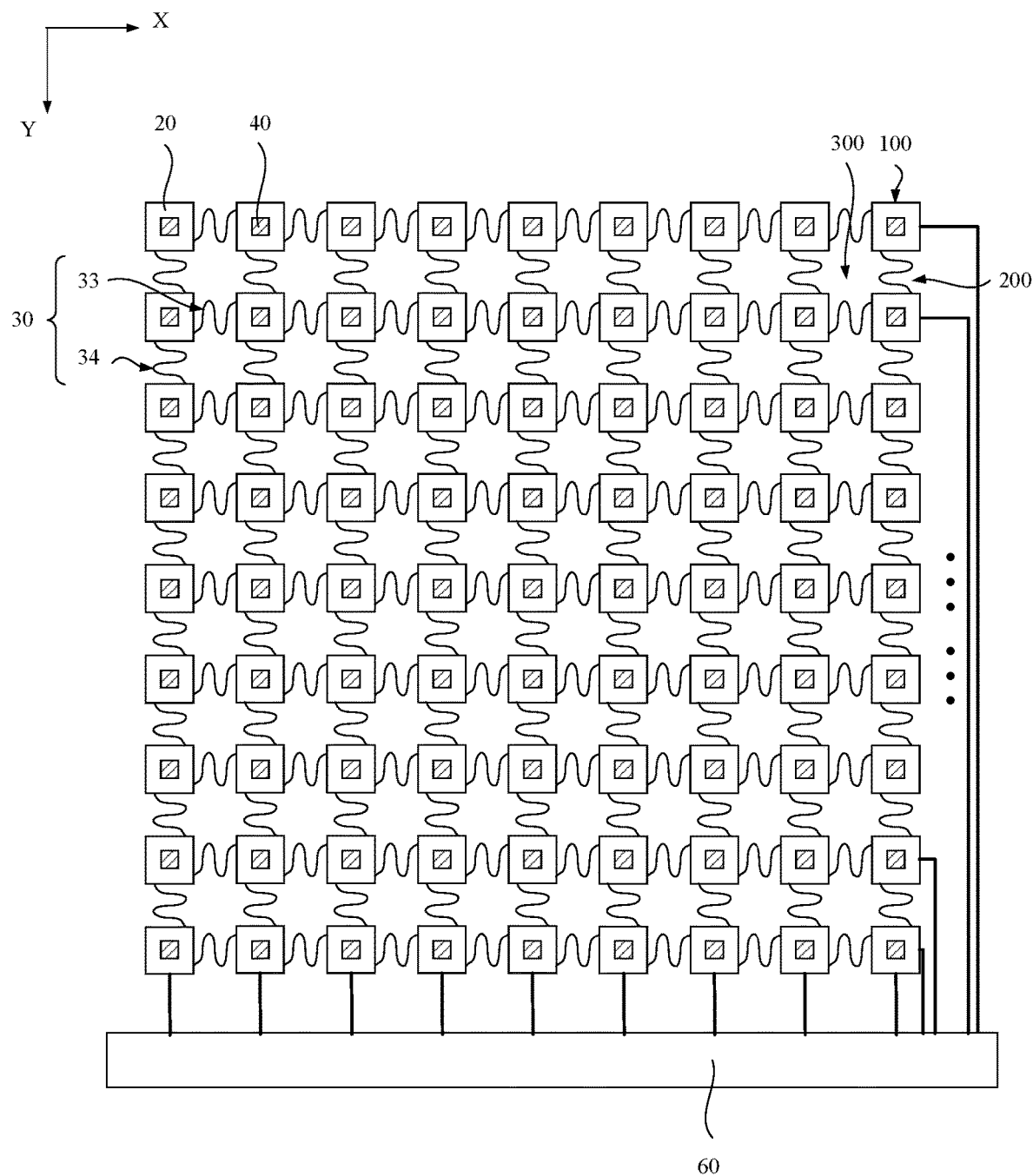
FIG. 8 is a second schematic plan structural view of the stretchable display module provided by the embodiment of the present application.

It can be understood that the first insulation layer 22 and/or the second insulation layer 24 is disposed between the first touch electrode layer 41 and the first touch connection line 42. Namely, the first touch electrode layer 41 and the first touch connection line 42 are disposed in different layers to facilitates the first touch electrode layer 41 disposed in a location having a better touch sensitivity and then connected to the first touch connection line 42 through the first via hole 001. In the present embodiment, with reference to FIG. 5, the third metal layer 25 can comprise the first touch electrode layer 41, the second metal layer 23 can comprise the first touch connection line 42. The second metal layer 23 and the connection bridges 30. Namely, the second insulation layer 24 is disposed between the first touch electrode layer 41 and the first touch connection line 42. At this time, the first via hole 001 is defined in the second insulation layer 24. The first touch electrode layer 41 is connected to the first touch connection line 42 through the first via hole 001. In an embodiment, with reference to FIGS. 8 to 10, the touch layer further comprises a second touch electrode layer 43, and a second touch connection line 44 connected to the second touch electrode layer 43. An end of the second touch connection line 44 away from the second touch electrode layer 43 is connected to the control circuit 60 through the connection bridges 30. The first insulation layer 22 and/or the second insulation layer 24 is disposed between the first touch electrode layer 41 and the second touch electrode layer 43.

The pixel islands 20 are arranged in an array and the touch modules 40 are arranged in an array. Adjacent two of the touch modules 40 are arranged along a first direction X or along a second direction Y. The connection bridges 30 comprise a plurality of first connection bridges 33 and a plurality of second connection bridges 34. Adjacent two of the touch modules 40 arranged along the first direction X are connected to each other through the first connection bridges 33. Adjacent two of the touch modules 40 arranged along the second direction Y are connected to each other through the second connection bridges 34.

The first connection bridge 33 is connected to the first touch connection line 42 in the touch module 40, the second connection bridge 34 is connected to the second touch connection line 44 in the touch module 40.

It can be understood that the touch layer can also be mutual capacitive touch structure, the touch layer further comprises a second touch electrode layer 43 and a second touch connection line 44 connected to the second touch electrode layer 43. The first insulation layer 22 and/or the second insulation layer 24 is disposed between the first touch electrode layer 41 and the second touch electrode layer 43. Namely, the first touch electrode layer 41 and the second touch electrode layer 43 are disposed in different layers, the second touch electrode layer 43 comprises at least one second touch electrode, the second touch electrode layer 43 is connected to the connection bridges 30 through the second touch connection line 44. In the present embodiment, the pixel islands 20 are arranged in an array, and the touch modules 40 are arranged in an array. Adjacent two of the touch modules 40 are arranged along a first direction X or along a second direction Y. The connection bridges 30 comprise a plurality of first connection bridges 33 and a plurality of second connection bridges 34. Adjacent two of the touch modules 40 arranged along the first direction X are connected to each other through the first connection bridges 33. Adjacent two of the touch modules 40 arranged along the second direction Y are connected to each other through the second connection bridges 34. The first connection bridge 33 is connected to the first touch connection line 42 in the touch modules 40. The second connection bridges 34 is connected to the second touch connection line 44 in the touch modules 40. Namely, along the first direction X, the first touch electrode layers 41 in the touch modules 40 located in the same row are connected in series, and, along the second direction Y, the second touch electrode layers 43 of the touch modules 40 located in the same column are connected in series. Specifically, the first touch electrode layer 41 can serve as a touch driver electrode (Tx), the second touch electrode layer 43 can serve as a touch sensing electrode (Rx), and the first direction X can be parallel to the second direction Y. In the present embodiment, with reference to FIG. 9, one of the first metal layer 21, the second metal layer 23, and the third metal layer 25 comprises the second touch electrode layer 43 and the second touch connection line 44.

It can be understood that one of the first metal layer 21, the second metal layer 23, and the third metal layer 25 comprises the second touch electrode layer 43 and the second touch connection line 44. Namely, the second touch electrode layer 43 and the second touch connection line 44 are disposed in the same layer. In the present embodiment, an end of the second touch connection line 44 is connected to the second touch electrode layer 43, another end of the second touch connection line 44 is connected to the connection bridge 30. The second touch connection line 44 can be connected to the connection bridge 30 in a different layer through the via hole, and can also be disposed in the same layer with the connection bridge 30. Specifically, the second metal layer 23 can comprise the second touch connection line 44, the second touch electrode layer 43, and the connection bridge 30. In other words, the second touch connection line 44, the second touch electrode layer 43, and the connection bridge 30 can be disposed in the same layer and are an integrally formed structure, which not only lowers manufacturing costs of the stretchable display module with touch functions, but also prevent additional increase of the thickness of the stretchable display module.

It is worth noting that when the second metal layer 23 comprises the second touch connection line 44, the second touch electrode layer 43, and the connection bridges 30, and the second touch connection line 44, the second touch electrode layer 43, and the connection bridges 30 are disposed in the same layer, because the second touch electrode layer 43 and the first touch electrode layer 41 are disposed in different layers, at this time, the first metal layer 21 or the third metal layer 25 comprises the first touch electrode layer 41, the first touch electrode layer 41 is connected to the first touch connection line 42 through the first via hole 001. Apparently, the second metal layer 23 can further comprise the first touch connection line 42. Namely, the second touch connection line 44, the second touch electrode layer 43, the connection bridges 30, and the first touch connection line 42 are disposed in the same layer. In the present embodiment, disposing the first touch connection line 42, the second touch connection line 44, the second touch electrode layer 43, and having the connection bridges 30 in the same layer being an integrally formed structure lowers manufacturing costs of the stretchable display module with the touch function while preventing additional increase of the thickness of the stretchable display module.

Figure 10:
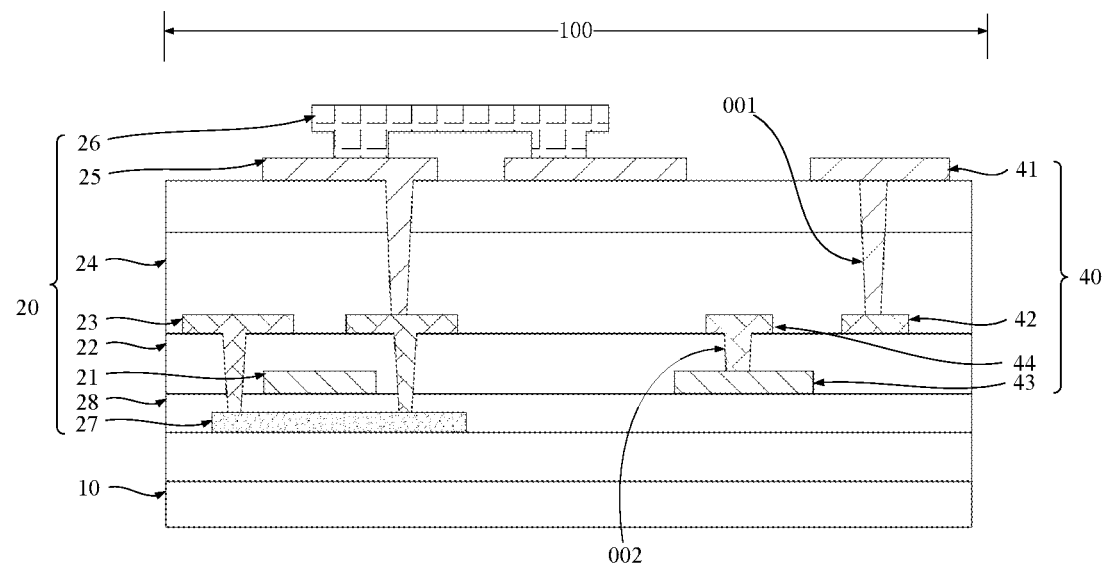
FIG. 10 is a sixth film layer schematic structural view of the pixel island of the stretchable display module provided by the embodiment of the present application.

In the present embodiment, with reference to FIG. 10, the first insulation layer 22 and/or the second insulation layer 24 is disposed between the second touch electrode layer 43 and the second touch connection line 44.

A second via hole 002 is defined in the pixel islands 20 and is located between the second touch electrode layer 43 and the second touch connection line 44, and the second touch electrode layer 43 is connected to the second touch connection line 44 through the second via hole 002.

It can be understood that the first insulation layer 22 and/or the second insulation layer 24 is disposed between the second touch electrode layer 43 and the second touch connection line 44. Namely, the second touch electrode layer 43 and the second touch connection line 44 are disposed in different layers, and the second touch electrode layer 43 and the first touch electrode layer 41 are required to be disposed in different layers such that the first touch electrode layer 41, second touch electrode layer 43, and the second touch connection line 44 are disposed in different film layers respectively. In the meantime, a second via hole 002 is defined in the pixel island 20 and is located between the second touch electrode layer 43 and the second touch connection line 44, and the second touch electrode layer 43 is connected to the second touch connection line 44 through the second via hole 002. In the present embodiment, for convenience of the second touch connection line 44 connected to the connection bridges 30, the second metal layer 23 can comprise the connection bridge 30 and the second touch connection line 44 such that the connection bridge 30 and the second touch connection line 44 are disposed in the same layer and are an integrally formed structure. The third metal layer 25 can comprise the first touch electrode, and the first metal layer 21 can comprise the second touch electrode. At this time, the first insulation layer 22 is disposed between the second touch electrode layer 43 and the second touch connection line 44, the second via hole 002 is disposed on the first insulation layer 22, the second touch electrode layer 43 is connected to the second touch connection line 44 through the second via hole 002. It is worth noting that with reference to FIG. 10. When the first touch electrode layer 41 and the first touch connection line 42 are disposed in different layers, the first touch electrode layer 41 is connected to the first touch connection line 42 through the first via hole 001. For convenience of the first touch connection line 42 connected to the connection bridges 30, the second metal layer 23 can comprise the connection bridges 30, the first touch connection line 42, and the second touch connection line 44 such that the connection bridges 30, the first touch connection line 42, and the second touch connection line 44 can be disposed in the same layer and be an integrally formed structure, which not only lowers the manufacturing costs of the stretchable display module with the touch function but also prevents additional increase of the thickness of the stretchable display module.

Figure 9:
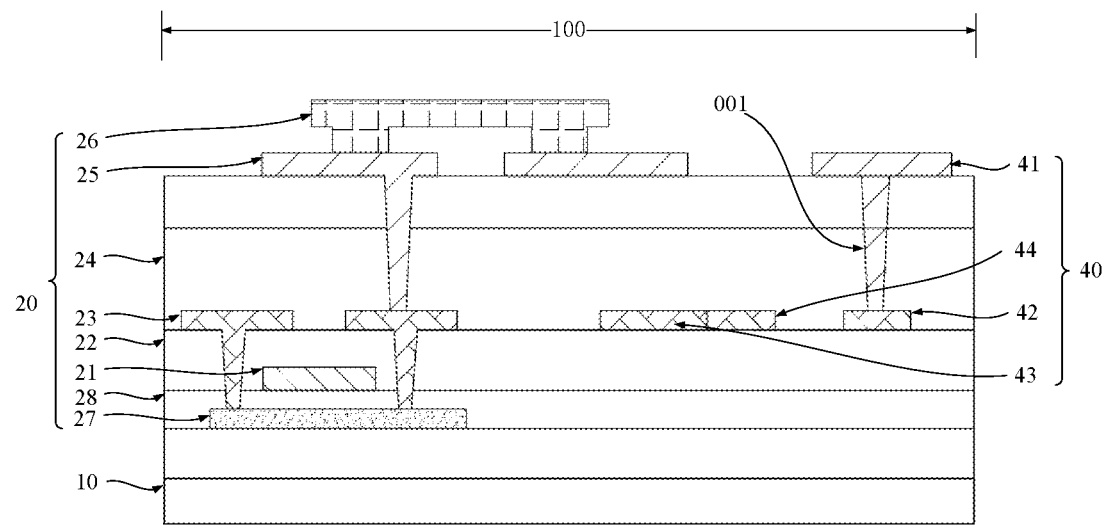
FIG. 9 is a fifth film layer schematic structural view of the pixel island of the stretchable display module provided by the embodiment of the present application.

In an embodiment, with reference to FIGS. 9 to 10, one of the first metal layer 21, the second metal layer 23, and the third metal layer 25 comprises the first touch electrode layer 41; and another of the first metal layer 21, the second metal layer 23, and the third metal layer 25 comprises the second touch electrode layer 43.

In an embodiment, the second metal layer 23 comprises the connection bridges 30, the first touch connection line 42, and the second touch connection line 44. It can be understood that as described in the above embodiment, the connection bridges 30 and the first touch connection line 42 and the second touch connection line 44 are disposed in the same layer and are an integrally formed structure, specific structures will not be described repeatedly here.

In an embodiment, with reference to FIG. 3, the display panel further comprises an organic filling layer 70 disposed on the flexible underlay 10 and located in the bridge connection region 200. The connection bridge 30 is disposed on the organic filling layer 70. The display panel further comprises a through hole 80 defined in the aperture region 300, and the through hole 80 extends through the flexible underlay 10.

In an embodiment, the display panel further comprises a first substrate 101 and a second substrate 102 disposed oppositely, and a flexible protective layer 90. The flexible protective layer 90, the flexible underlay 10, the pixel islands 20, and the connection bridges 30 are located between the first substrate 101 and the second substrate 102.

The flexible protective layer 90 comprises a first flexible adhesive layer 91 disposed between the flexible underlay 10 and the first substrate 101, a second flexible adhesive layer 92 disposed between the pixel islands 20 and the second substrate 102, and a third flexible adhesive layer 93 disposed in the through hole 80.

It can be understood that the flexible protective layer 90 comprises the first flexible adhesive layer 91, the second flexible adhesive layer 92, and the third flexible adhesive layer 93. The first flexible adhesive layer 91, the second flexible adhesive layer 92, and the third flexible adhesive layer 93 can be disposed integrally. The pixel islands 20 are embedded in the flexible protective layer 9 constituted by the first flexible adhesive layer 91, the second flexible adhesive layer 92, and the third flexible adhesive layer 93. A material of the flexible protective layer 90 can be stretchable adhesive material such as an optical clear adhesive. Filling the integrally disposed flexible protective layer 90 among two sides of the pixel islands 20 and each of the pixel islands 20 makes the stretchable display module achieve spatial multi-dimensional stretching and deforming.

The present application also provides a stretchable display device, the stretchable display device comprises the stretchable display module in the above embodiment. The stretchable display device of the present application can be applied to flexible human-computer interactive display, medical display, freely stretchable vehicle-mounted display terminal, and wearable display terminal products.

The embodiment of the present application embeds the touch layer into the display panel and disposes the touch modules 40 in the island regions 100 respectively. One of the touch modules 40 is disposed in each of the pixel islands, adjacent two of at least some of the touch modules are connected to each other through the connection bridges 30 such that the touch layer and each pixel islands 20 of the display panel are combined tightly structurally, which prevents increase of stretchable display module thickness and lowers manufacturing costs of the stretchable display module with touch functions while guaranteeing display panel flexible stretchable and achieving touch functions.

Although the preferred embodiments of the present invention have been disclosed as above, the aforementioned preferred embodiments are not used to limit the present invention. The person of ordinary skill in the art may make various changes and modifications without departing from the spirit and scope of the present invention. Therefore, the scope of protection of the present invention is defined by the scope of the claims.

What is claimed is:

1. A stretchable display module, comprising a display panel and a touch layer embedded in the display panel, wherein the display panel comprises a plurality of island regions disposed at intervals, bridge connection regions each of which is located between adjacent two of the island regions, and aperture regions each of which is defined between each of the island regions and each of the bridge connection regions, and the display panel comprises:

a flexible underlay disposed in the island regions and the bridge connection regions;

a plurality of pixel islands disposed on the flexible underlay, wherein one of the pixel islands is disposed in each of the island regions, and at least one pixel is disposed on each of the pixel islands;

a plurality of connection bridges disposed in the bridge connection regions, wherein each of the connection bridges is connected to adjacent two of the pixel islands;

wherein the touch layer comprises a plurality of touch modules disposed in the island regions, one of the touch modules is disposed on each of the pixel islands, and adjacent two of at least some of the touch modules are connected to each other through the connection bridges;

wherein the touch module comprises a first touch electrode layer and a first touch connection line connected to the first touch electrode layer;

wherein the stretchable display module comprises a control circuit, an end of the first touch connection line away from the first touch electrode layer is connected to the control circuit through the connection bridges;

wherein the pixel on the pixel islands is electrically connected to the control circuit through the connection bridges;

wherein the pixel island comprises a first metal layer, first insulation layer, a second metal layer, a second insulation layer, and a third metal layer that are stacked on the flexible underlay from bottom to top;

wherein one of the first metal layer, the second metal layer, and the third metal layer comprises the first touch electrode layer;

wherein the touch layer further comprises a second touch electrode layer, and a second touch connection line connected to the second touch electrode layer, an end of the second touch connection line away from the second touch electrode layer is connected to the control circuit through the connection bridge, and the first insulation layer and/or the second insulation layer is disposed between the first touch electrode layer and the second touch electrode layer;

wherein a plurality of the pixel islands and a plurality of the touch modules are arranged in arrays respectively, adjacent two of the touch modules are arranged along a first direction or along a second direction, a plurality of the connection bridges comprise a plurality of first connection bridges and a plurality of second connection bridges, adjacent two of the touch modules arranged along the first direction are connected to each other through the first connection bridge, adjacent two of the touch modules arranged along the second direction are connected to each other through the second connection bridge;

wherein the first connection bridges are connected to the first touch connection lines of the touch modules, the second connection bridges are connected to the second touch connection lines in the touch modules;

wherein the first insulation layer and/or the second insulation layer is disposed between the second touch electrode layer and the second touch connection line; and wherein a second via hole is defined in the pixel island and is located between the second touch electrode layer and the second touch connection line, and the second touch electrode layer is connected to the second touch connection line through the second via hole.

2. The stretchable display module according to claim 1, wherein the touch layer comprises a plurality of touch units and a plurality of touch signal lines, each of the touch units is connected to one of the touch signal lines, and each of the touch units comprises at least two of the touch modules; and
in one of the touch units, adjacent two of the touch modules are connected through the connection bridge.

3. The stretchable display module according to claim 1, wherein one of the first metal layer, the second metal layer, and the third metal layer comprises the first touch connection line.

4. The stretchable display module according to claim 2, wherein the first insulation layer and/or the second insulation layer is disposed between the first touch electrode layer and the first touch connection line; and
a first via hole is defined in the pixel island and is located between the first touch electrode layer and the first touch connection line, and the first touch electrode layer is connected to the first touch connection line through the first via hole.

5. The stretchable display module according to claim 1, wherein one of the first metal layer, the second metal layer, and the third metal layer comprises the second touch electrode layer and the second touch connection line.

6. The stretchable display module according to claim 1, wherein
another of the first metal layer, second metal layer, and the third metal layer comprises the second touch electrode layer.

7. The stretchable display module according to claim 1, wherein the second metal layer comprises the connection bridge, the first touch connection line, and the second touch connection line.

8. The stretchable display module according to claim 1, wherein the display panel further comprises an organic filling layer disposed on the flexible underlay and located in the bridge connection region, and the connection bridge is disposed on the organic filling layer.

9. The stretchable display module according to claim 1, wherein the display panel further comprises a through hole defined in the aperture region, and the through hole extends through the flexible underlay.

10. The stretchable display module according to claim 9, wherein the display panel further comprises a first substrate and a second substrate disposed oppositely, and a flexible protective layer, the flexible protective layer, the flexible underlay, the pixel islands, and the connection bridges are disposed between the first substrate and the second substrate; and
the flexible protective layer comprises a first flexible adhesive layer disposed between the flexible underlay and the first substrate, a second flexible adhesive layer disposed between the pixel island and the second substrate, and a third flexible adhesive layer disposed in the through hole.

11. The stretchable display module according to claim 1, wherein the connection bridge is curved, the connection bridge at least comprises a first bending section and a second bending section.

12. A stretchable display device, comprising a stretchable display module;
wherein the stretchable display module comprises a display panel and a touch layer embedded in the display panel, the display panel comprises a plurality of island regions disposed at intervals, bridge connection regions each of which is located between adjacent two of the island regions, and aperture regions each of which is defined between each of the island regions and each of the bridge connection regions, and the display panel comprises:
a flexible underlay disposed in the island regions and the bridge connection regions;
a plurality of pixel islands disposed on the flexible underlay, wherein one of the pixel islands is disposed in each of the island regions, and at least one pixel is disposed on each of the pixel islands;
a plurality of connection bridges disposed in the bridge connection regions, wherein each of the connection bridges is connected to adjacent two of the pixel islands;
wherein the touch layer comprises a plurality of touch modules disposed in the island regions, one of the touch modules is disposed on each of the pixel islands, and adjacent two of at least some of the touch modules are connected to each other through the connection bridges;
wherein the touch module comprises a first touch electrode layer and a first touch connection line connected to the first touch electrode layer;
wherein the stretchable display module comprises a control circuit, an end of the first touch connection line away from the first touch electrode layer is connected to the control circuit through the connection bridges;
wherein the pixel on the pixel islands is electrically connected to the control circuit through the connection bridges;
wherein the pixel island comprises a first metal layer, first insulation layer, a second metal layer, a second insulation layer, and a third metal layer that are stacked on the flexible underlay from bottom to top;
wherein one of the first metal layer, the second metal layer, and the third metal layer comprises the first touch electrode layer;
wherein the touch layer further comprises a second touch electrode layer, and a second touch connection line connected to the second touch electrode layer, an end of the second touch connection line away from the second touch electrode layer is connected to the control circuit through the connection bridge, and the first insulation layer and/or the second insulation layer is disposed between the first touch electrode layer and the second touch electrode layer;

wherein a plurality of the pixel islands and a plurality of the touch modules are arranged in arrays respectively, adjacent two of the touch modules are arranged along a first direction or along a second direction, a plurality of the connection bridges comprise a plurality of first connection bridges and a plurality of second connection bridges, adjacent two of the touch modules arranged along the first direction are connected to each other through the first connection bridge, adjacent two of the touch modules arranged along the second direction are connected to each other through the second connection bridge;

wherein the first connection bridges are connected to the first touch connection lines of the touch modules, the second connection bridges are connected to the second touch connection lines in the touch modules;

wherein the first insulation layer and/or the second insulation layer is disposed between the second touch electrode layer and the second touch connection line; and wherein a second via hole is defined in the pixel island and is located between the second touch electrode layer and the second touch connection line, and the second touch electrode layer is connected to the second touch connection line through the second via hole.

13. The stretchable display device according to claim 12, wherein the touch layer comprises a plurality of touch units and a plurality of touch signal lines, each of the touch units is connected to one of the touch signal lines, and each of the touch units comprises at least two of the touch modules; and in one of the touch units, adjacent two of the touch modules are connected through the connection bridge.

14. A stretchable display module, comprising a display panel and a touch layer embedded in the display panel, wherein the display panel comprises a plurality of island regions disposed at intervals, bridge connection regions each of which is located between adjacent two of the island regions, and aperture regions each of which is defined between each of the island regions and each of the bridge connection regions, and the display panel comprises:

a flexible underlay disposed in the island regions and the bridge connection regions;

a plurality of pixel islands disposed on the flexible underlay, wherein one of the pixel islands is disposed in each of the island regions, and at least one pixel is disposed on each of the pixel islands;

a plurality of connection bridges disposed in the bridge connection regions, wherein each of the connection bridges is connected to adjacent two of the pixel islands;

wherein the touch layer comprises a plurality of touch modules disposed in the island regions, one of the touch modules is disposed on each of the pixel islands, and adjacent two of at least some of the touch modules are connected to each other through the connection bridges;

wherein the touch module comprises a first touch electrode layer and a first touch connection line connected to the first touch electrode layer;

wherein the stretchable display module comprises a control circuit, an end of the first touch connection line away from the first touch electrode layer is connected to the control circuit through the connection bridges;

wherein the pixel on the pixel islands is electrically connected to the control circuit through the connection bridges;

wherein the pixel island comprises a first metal layer, first insulation layer, a second metal layer, a second insulation layer, and a third metal layer that are stacked on the flexible underlay from bottom to top;

wherein one of the first metal layer, the second metal layer, and the third metal layer comprises the first touch electrode layer;

wherein the touch layer further comprises a second touch electrode layer, and a second touch connection line connected to the second touch electrode layer, an end of the second touch connection line away from the second touch electrode layer is connected to the control circuit through the connection bridge, and the first insulation layer and/or the second insulation layer is disposed between the first touch electrode layer and the second touch electrode layer;

wherein a plurality of the pixel islands and a plurality of the touch modules are arranged in arrays respectively, adjacent two of the touch modules are arranged along a first direction or along a second direction, a plurality of the connection bridges comprise a plurality of first connection bridges and a plurality of second connection bridges, adjacent two of the touch modules arranged along the first direction are connected to each other through the first connection bridge, adjacent two of the touch modules arranged along the second direction are connected to each other through the second connection bridge;

wherein the first connection bridges are connected to the first touch connection lines of the touch modules, the second connection bridges are connected to the second touch connection lines in the touch modules; and wherein the second metal layer comprises the connection bridge, the first touch connection line, and the second touch connection line.

* * * * *